(12) United States Patent
Curneen et al.

(10) Patent No.: US 12,466,303 B1
(45) Date of Patent: Nov. 11, 2025

(54) INSULATED CARGO BAY ON ROBOTIC TRANSPORT VEHICLE

(71) Applicant: Amazon Technologies, Inc., Seattle, WA (US)

(72) Inventors: Amy Margaret Curneen, Seattle, WA (US); Travis Glover, Seattle, WA (US); Patrick Chow, Issaquah, WA (US); Nicholas Mendenhall, Kirkland, WA (US); Nicholas Paul Rush, Bremerton, WA (US); Ryan F Conroy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 337 days.

(21) Appl. No.: 18/080,513

(22) Filed: Dec. 13, 2022

Related U.S. Application Data

(60) Provisional application No. 63/407,537, filed on Sep. 16, 2022.

(51) Int. Cl.
    *B60P 3/20*     (2006.01)
    *B60P 3/00*     (2006.01)
    *F25D 3/06*     (2006.01)
    *F25D 23/06*    (2006.01)

(52) U.S. Cl.
    CPC ............... *B60P 3/20* (2013.01); *B60P 3/007* (2013.01); *F25D 3/06* (2013.01); *F25D 23/066* (2013.01); *F25D 2201/10* (2013.01); *F25D 2303/082* (2013.01); *F25D 2303/0843* (2013.01); *F25D 2303/0844* (2013.01); *F25D 2303/0845* (2013.01); *F25D 2400/20* (2013.01); *F25D 2400/38* (2013.01)

(58) Field of Classification Search
    CPC .... B60P 3/007; B60P 3/20; F25D 3/06; F25D 3/08
    See application file for complete search history.

(56) References Cited

U.S. PATENT DOCUMENTS

| | | | | |
|---|---|---|---|---|
| 425,578 | A | * | 4/1890 | Pearson ............... B60P 3/20 62/239 |
| 1,083,031 | A | * | 12/1913 | Raum ............... B60P 3/20 296/24.35 |
| 1,185,195 | A | * | 5/1916 | Graham ............... B60P 3/20 62/331 |

(Continued)

*Primary Examiner* — Christopher R Zerphey
(74) *Attorney, Agent, or Firm* — Kilpatrick Townsend & Stockton LLP

(57) ABSTRACT

A robotic delivery vehicle may be capable of providing sufficient insulation for perishable items without sacrificing the delivery robotic delivery vehicles' travel range by using passive cooling configurations. Passive cooling configurations may include improving the insulation performance of the robotic delivery vehicle as well as incorporating cooling elements. The robotic delivery vehicle may include a cargo bay liner and a vehicle lid that covers and encloses a cargo bay from the external environment. The cargo bay liner may include an insulated bottom and at least one insulated wall extending from the insulated bottom, wherein the at least one insulated wall and the insulated bottom define a cargo volume. The lid may define a lid volume and is configured to selectively enclose the cargo volume.

17 Claims, 10 Drawing Sheets

(56) References Cited

U.S. PATENT DOCUMENTS

| | | | | |
|---|---|---|---|---|
| 1,369,367 | A * | 2/1921 | Thomson | A47J 41/0044 |
| | | | | 220/560.04 |
| 1,452,090 | A * | 4/1923 | Olin | F25D 3/06 |
| | | | | 296/181.6 |
| 1,489,562 | A * | 4/1924 | Valenti | F25D 3/06 |
| | | | | 62/529 |
| 3,807,194 | A * | 4/1974 | Bond | F25D 3/06 |
| | | | | 62/438 |
| 4,698,775 | A * | 10/1987 | Koch | G05D 1/027 |
| | | | | 414/940 |
| 5,669,233 | A * | 9/1997 | Cook | B65D 81/3823 |
| | | | | 62/457.2 |
| 6,822,198 | B2 * | 11/2004 | Rix | F25D 3/08 |
| | | | | 219/386 |
| 7,730,739 | B2 * | 6/2010 | Fuchs | F25C 1/22 |
| | | | | 62/530 |
| 8,292,119 | B2 * | 10/2012 | Kenneally | F25D 3/125 |
| | | | | 220/592.2 |
| 8,763,811 | B2 * | 7/2014 | Lantz | B65D 65/466 |
| | | | | 206/584 |
| 8,777,042 | B2 * | 7/2014 | Matthews | F25D 23/066 |
| | | | | 220/495.03 |
| 9,060,508 | B2 * | 6/2015 | Anti | F25D 3/06 |
| 9,557,740 | B2 * | 1/2017 | Crawley | G05D 1/0248 |
| 9,963,287 | B2 * | 5/2018 | Vogel | F25D 3/06 |
| 9,989,299 | B1 * | 6/2018 | Ballard | B65D 81/3813 |
| 10,077,934 | B1 * | 9/2018 | Dizon | F25D 25/005 |
| 10,168,090 | B1 * | 1/2019 | Chapman, Jr. | A61J 1/065 |
| 10,272,934 | B2 * | 4/2019 | DeFrancia | B62B 1/12 |
| 10,562,694 | B2 * | 2/2020 | Austerberry | B65D 81/3816 |
| 11,099,562 | B1 * | 8/2021 | Ebrahimi Afrouzi | |
| | | | | G05D 1/0225 |
| 11,354,618 | B2 * | 6/2022 | DeJarnette | G06Q 10/087 |
| 11,414,002 | B2 * | 8/2022 | Georgeson | B60P 3/007 |
| 11,554,706 | B2 * | 1/2023 | Radetzki | B62B 3/005 |
| 11,591,133 | B2 * | 2/2023 | Longley | F28D 20/02 |
| 11,649,088 | B2 * | 5/2023 | Väin | B65D 25/08 |
| | | | | 220/500 |
| 11,724,897 | B2 * | 8/2023 | Galin | B60P 3/06 |
| | | | | 414/812 |
| 12,017,547 | B2 * | 6/2024 | Kazyak | B60L 1/00 |
| 12,135,553 | B2 * | 11/2024 | Brooks | G05D 1/0061 |
| 2003/0082357 | A1 * | 5/2003 | Gokay | E04B 1/803 |
| | | | | 428/34.1 |
| 2011/0016911 | A1 * | 1/2011 | Mosby | A45C 13/02 |
| | | | | 62/457.7 |
| 2021/0155464 | A1 * | 5/2021 | Takai | B66F 9/12 |
| 2021/0395011 | A1 * | 12/2021 | Crawford, Jr. | G06Q 10/087 |
| 2023/0060274 | A1 * | 3/2023 | Sawafta | F25D 11/006 |
| 2023/0271539 | A1 * | 8/2023 | Mccormick | B60R 5/044 |
| | | | | 296/24.35 |
| 2024/0300564 | A1 * | 9/2024 | Owens | B62B 3/10 |

* cited by examiner

INSULATED CARGO BAY ON ROBOTIC TRANSPORT VEHICLE

CROSS REFERENCE TO RELATED APPLICATIONS

This application is a Nonprovisional of and claims priority to U.S. Provisional Application No. 63/407,537, filed Sep. 16, 2022, and titled "INSULATED CARGO BAY ON ROBOTIC TRANSPORT VEHICLE," the contents of which are herein incorporated in its entirety.

BACKGROUND

Robotic vehicles may be used to deliver items on demand. Because of onboard power constraints, deliver timelines, and heat generation attributed to robotic equipment, conventionally, such deliveries have been limited to non-perishable items and food items not requiring refrigeration.

DETAILED DESCRIPTION

Figure 1:
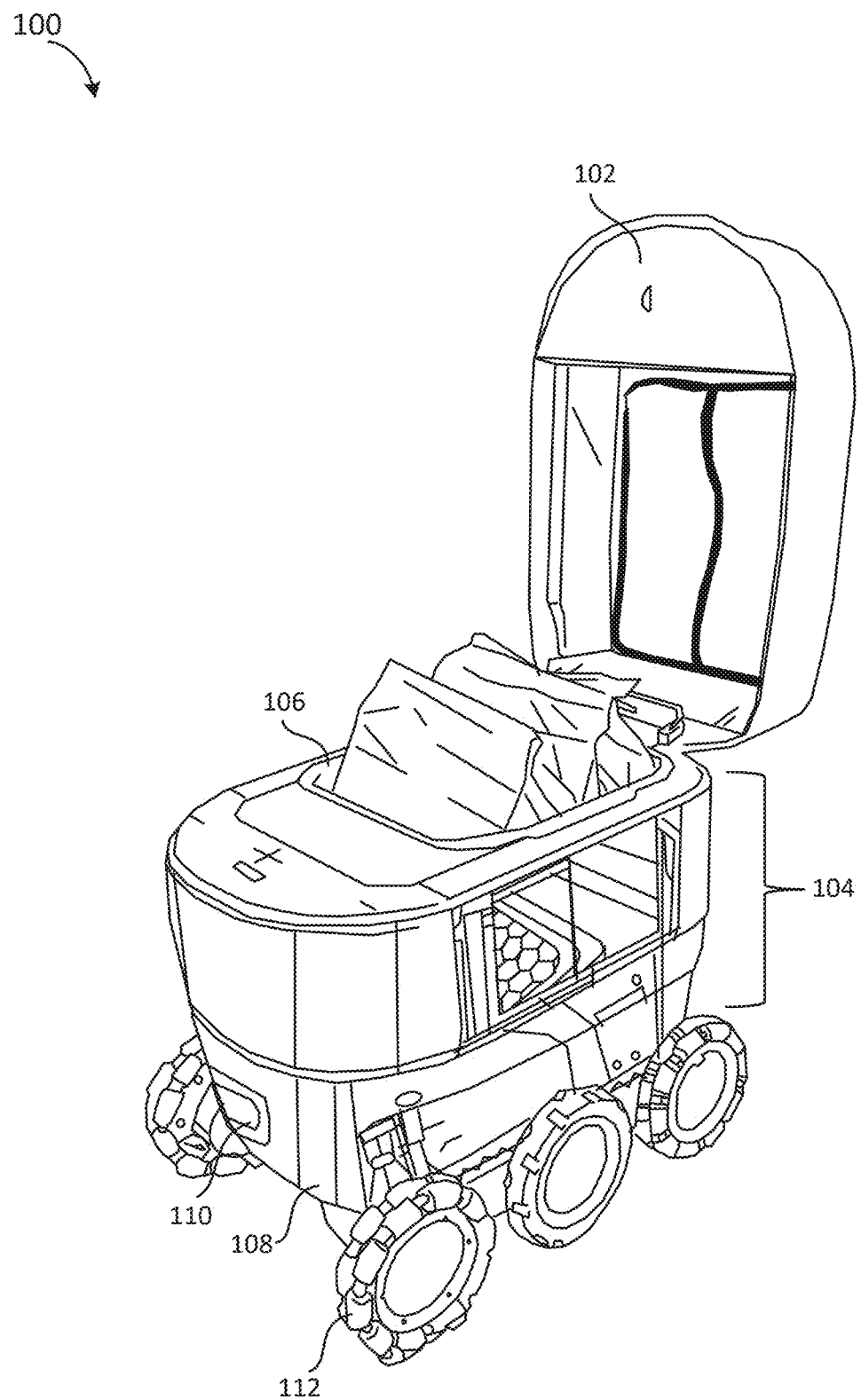
FIG. 1 depicts an example robotic transport vehicle that includes an insulated cargo bay that has been specifically adapted to keeping perishable items cool for a duration of time, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present description generally relate to robotics, and more particularly, to robotic delivery vehicles that can be quickly loaded and unloaded by dispatch centers and are capable of providing sufficient insulation for perishable items without sacrificing the robotic delivery vehicles' travel range. Examples of insulation configurations for passive cooling of a cargo bay within a robotic delivery vehicle are described. As passive cooling does not consume energy like active cooling, robotic delivery vehicles incorporated with passive cooling configurations are capable of transporting perishable items without significantly reducing the vehicle's travel range. Common passive cooling methods include improving the insulation of a system as well as incorporating cooling elements such as ice packs to the system. For example, a robotic delivery vehicle may include a cargo bay within the vehicle body that houses the packages or items being delivered, a cargo bay liner, a vehicle lid that covers and encloses the cargo bay from the external environment, and an access panel that forms the bottom of the cargo bay and separates the cargo bay from an equipment compartment of the vehicle where the electronics and equipment of the vehicle are located. Each of the cargo bay, the cargo bay liner, the vehicle lid, and the access panel may be modified with insulation configurations as desired. The insulation configurations may be any combination of materials, forms, and structures as described herein. Besides insulation configurations, the robotic delivery vehicle may further include cooling elements disposed in various locations within the robotic delivery vehicle. In some examples, the cargo bay may include slots into which cooling elements can be slid or inserted. The cargo bay liner may be insulated with a first insulating layer and a second insulating layer, and cooling elements may be disposed within the cargo bay liner (e.g., between the insulating layers). The vehicle lid may be configured to have different insulations at different parts of the vehicle lid. The access panel may also include a first insulation layer facing the equipment compartment to reflect back the heat generated within the equipment compartment as well as a second insulation layer facing the cargo bay to insulate the heat being transferred from the equipment compartment.

In a particular example, the robotic delivery vehicle may include a cargo bay that has a first insulated surface that defines a bottom of the cargo bay and represents a boundary between the cargo bay and the equipment compartment of the robotic delivery vehicle. The cargo bay may include a drip tray at the bottom. The drip tray may include a plurality of openings to guide out moisture being formed from condensation. The cargo bay may include at least one functional pouch attached on an interior wall of the cargo bay. Cooling elements or other functional inserts like desiccant packs can be placed into the functional pouch as needed. The robotic delivery vehicle may also include a removable insulated cargo bay liner to house the items being delivered. The cargo bay liner may include a circumferential wrapper to provide additional insulation. The robotic delivery vehicle may further include a cargo bay lid that is insulated.

Turning now to the figures, FIG. 1 depicts an example robotic delivery vehicle 100 that includes an insulated cargo bay that has been specifically adapted to keeping perishable items cool for a duration of time, according to at least one example. The robotic delivery vehicle 100 includes a lid 102, a frame enclosure 104 that includes a cargo bay 106, and an equipment compartment 108. As shown in FIG. 1, the frame enclosure 104 of the robotic delivery vehicle may be mounted to a set of wheels 112. In some examples, the equipment compartment 108 may be nearer to the wheels 112 than the cargo bay 106.

The cargo bay 106 is configured to store cargo being transported by the robotic delivery vehicle. The cargo bay 106 may define a cargo volume, e.g., a volume into which may be placed cargo items such as food. The cargo bay 106 may be separated from the equipment compartment 108 by an access panel (not shown in FIG. 1). The frame enclosure 104 and the cargo bay 106 may have more or less rectangular shapes, though, other shapes are also possible (e.g., oval, circle, hexagon, semi-circle, or any combination thereof). In some examples, the interior of the cargo bay 106 may be insulated using any suitable combination of insulation materials such as those described herein.

The equipment compartment 130 may house at least a portion of the robotic equipment, electronics, and the like. Examples of robotic equipment and electronics include one or more batteries, electric motors, communication antennae, Global Positioning System (GPS) chips, control boards, and the like. The robotic equipment in the equipment compartment 130 may include components that generate heat during operation. For example, under normal conditions, the temperature may reach around 140° F. Other components of the robotic equipment such as communication antennas, sensors (i.e., sensor 110 in FIG. 1), and the like may be mounted at peripheral locations about the robotic delivery vehicle to avoid interference with other components and/or to have fields of view surrounding the vehicle.

The robotic delivery vehicle 100 also includes a lid 102 that is coupled with the frame enclosure 104. The lid 102 may be coupled to the frame enclosure 104 via any suitable coupling mechanism. For example, the lid 102 may be coupled to the frame enclosure 104 via a suitable hinge structure, ball and socket joints, or the like. In some examples, the lid 102 may be secured to the frame enclosure 104 to prevent unwanted access. For example, an electronic magnet lock may be used to connect the lid 102 to the frame enclosure 104. In some examples, the lid 102 may be lockable and unlockable when certain conditions are present (e.g., by using a smartphone, when at a certain location, etc.).

The lid 102 may be shaped to match or otherwise correspond to the shape of the frame enclosure 104 generally and the cargo bay 106 specifically. This is because, in some examples, the lid 102 may be used to enclose the cargo bay 106, including preventing unwanted access to the contents of the cargo bay 106. Thus, the lid 102 may be opened to allow access to the cargo bay 106 and closed to restrict access.

Figure 2:
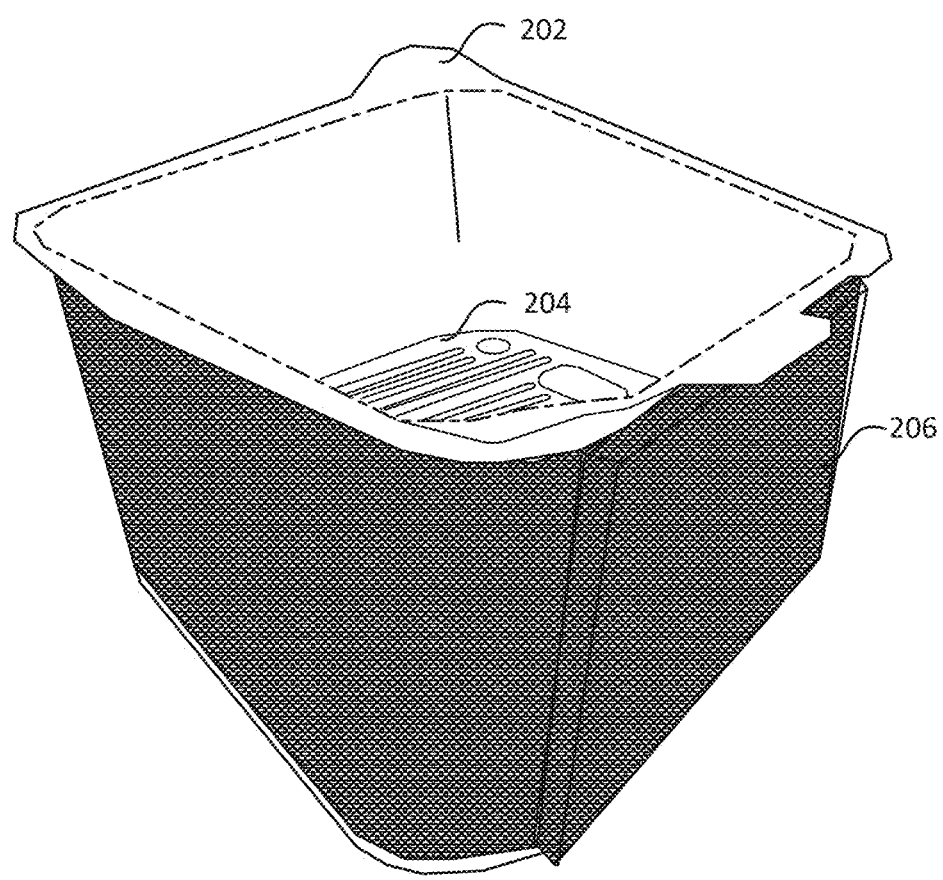
FIG. 2 depicts an example insulated line for a cargo bay, according to at least one example.

FIG. 2 depicts an example insulated liner 200 for a cargo bay, according to at least one example. The insulated liner 200 may be configured for installation within a cargo bay such as the cargo bay 106 (FIG. 1) described herein. In some examples, the insulated liner 200 may be removably installable within the cargo bay 106 (FIG. 1). In some examples, the insulated liner 200 may be installed within the cargo bay 106 (FIG. 1) in a more permanent manner.

The insulated liner 200 may include a liner insert 202. The liner insert 202 may be formed from a thin pliable material such as plastic. In some examples, the liner insert 202 may also be formed from any materials as desired. Exemplary liner insert 202 materials include, but are not limited to, polyurethane, ethylene-vinyl acetate (EVA), expanded polypropylene (EPP), expanded polystyrene (EPS), and expanded polyethylene (EPE).

The liner insert 202 may be a separate part from the rest of the insulated liner 200. In some examples, the liner insert 202 may be formed as a layer within a composite structure that makes up the insulated liner 200. Considering the materials from which the liner insert 202 may be formed, the liner insert 202 may form a waterproof barrier. Such a barrier may be desirable to catch spills from the cargo being transported. This may ensure that spilled liquids, condensation, and other liquids are not able to pass into the other compartments of the robotic delivery vehicle.

The insulated liner 200 may also be configured to receive an ice pack 204. The ice pack 204 may be removable. In some examples, the ice pack 204 may be covered or housed within an extra shield to prevent the bags carrying the cargo from getting wet from condensation from the ice pack 204. In some examples, the liner insert 202 may also include a grooved surface. The grooved surface may be incorporated to the liner insert 202 to secure cargo or packages from abrupt movements during transport. The grooved surface may include any dimensional pattern (e.g., three-dimensional patterns extruding or recessing from the grooved surface) that increases the friction between the bottom surface of the cargo or packages being transported and the grooved surface. In some examples, a top protective member (not shown in FIG. 2) may be placed on top of the ice pack 204 to prevent cargo or packages being transported from undesired contact or wetting. The top protective member can be a waterproof plastic pad that prevents the packages from contacting moisture sources such as ice packs. Depending on examples, the top protective member may be permanently fixed to or removable from the liner insert 202. Moreover, the top protective member may also include grooved surface as described above.

The insulated liner 200 may also include a circumferential wrapper 206 to provide improved insulation. The circumferential wrapper 206 may be formed from a pliable foam, a rigid foam (e.g., milled, cast, etc.), or in any other suitable manner. In some examples, the circumferential wrapper 206 may include thin sheets of pliable foam that wrap around and cover all outer surfaces of the liner insert 202. Although FIG. 2 depicts a circumferential wrapper 206 that wraps every outer surface of the liner insert 202 and the circumferential wrapper 206 covers the full area of each outer surface of the liner insert 202, a person skilled in the art should perceive that the circumferential wrapper 206 is not required to cover every outer surface or the full area of each outer surface of the liner insert 202. The size, coverage, and location of the circumferential wrapper 206 is tunable as desired.

Furthermore, the circumferential wrapper 206 may have a laminated structure including multiple layers of different materials as needed. For example, a laminated circumferential wrapper 206 may include a plastic layer to protect the wrapper from moisture and a low-density foam so that the laminated circumferential wrapper can simultaneously entertain desired attributes of waterproof, improved thermal insulation, and improved battery efficiency (the overall weight of the robotic delivery vehicle is reduced because of the low-density foam).

Figure 3:
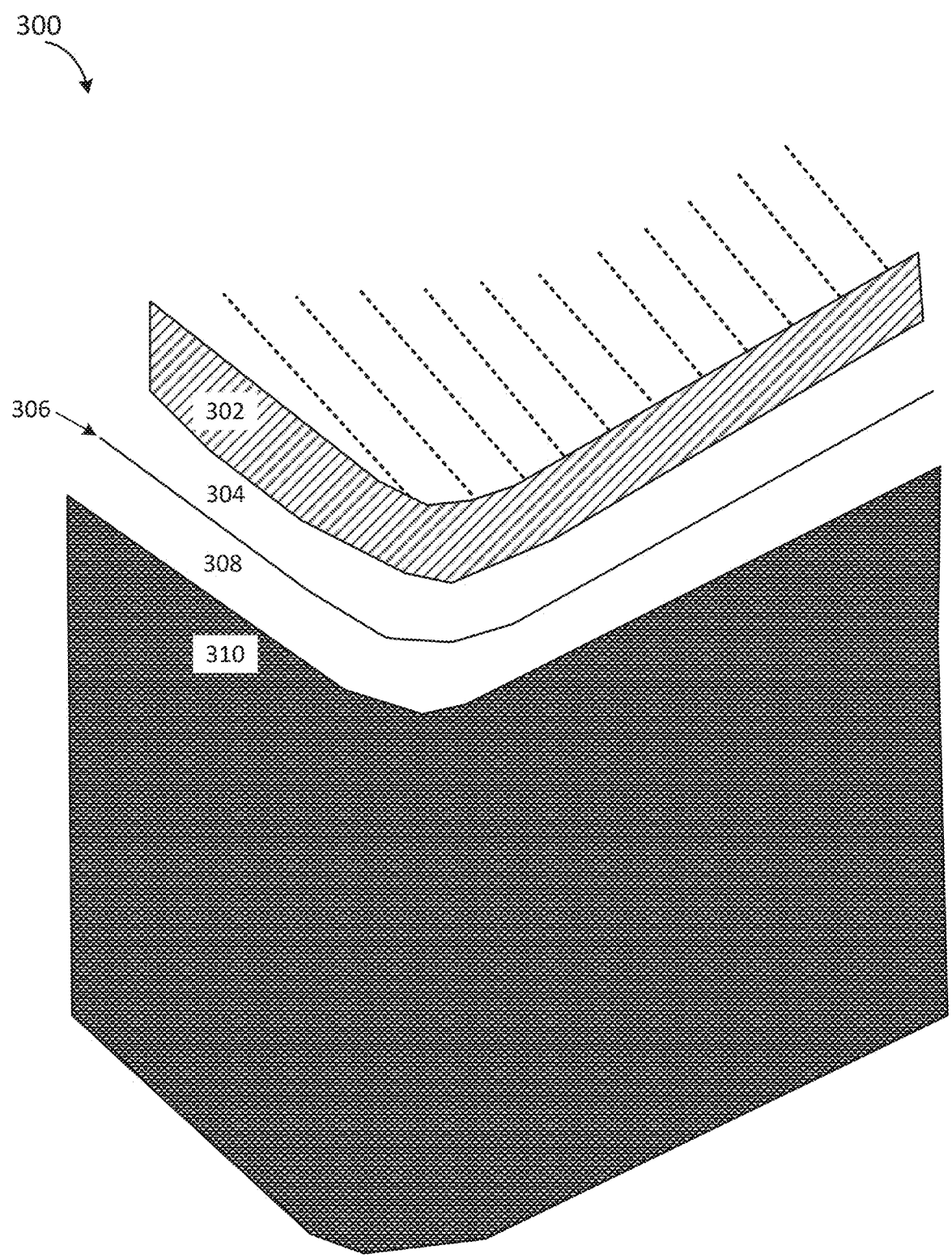
FIG. 3 depicts a cross-sectional view of an example configuration of an insulated liner, according to at least one example.

FIG. 3 depicts a cross-sectional view of an example configuration of an insulated liner 300, according to at least one example. As described above, in some examples, the insulated liner 300 may include a top protective member 302, a cooling-element volume 304, a liner insert 306, a first insulating layer 308, and a second insulating layer 310. The liner insert 306 has an inner surface that is closer to the packages being delivered and an outer surface that is away from the inner surface by a displacement defined by the thickness (t) of the liner insert 306.

The cooling-element volume 304 refers to the space between the lower surface of the top protective member 302 and the inner surface of the liner insert 306 where cooling elements can be placed. Exemplary cooling elements include, but are not limited to ice packs, dry ice blocks, gel ice packs and the like.

The first insulating layer 308 and the second insulating layer 310 provide additional insulation to the insulated liner 300. The first insulating layer 308 is disposed between the outer surface of the liner insert 306 and second insulating layer 310. The first insulating layer 308 may include insulation material that circumferentially covers both the vertical walls of the liner insert 306 and the bottom of the liner insert 306. Exemplary insulation materials include, but are not limited to, foam, wool, metallic insulation materials (e.g., heat reflective bubble wrap), natural fibers, polystyrene, or the like. The first cooling-element volume 320 and the second cooling-element volume 330 may include different cooling elements as needed.

Similar as the first insulating layer 308, a second insulating layer 310 may be disposed adjacent to the first insulating layer 308. In some examples, the second insulating layer 310 may be orthogonally oriented with respect to the bottom of the cargo bay 106 in FIG. 1. The first insulating layer 308 and the second insulating layer 310 may include different insulation materials as needed. In some examples, the first insulating layer 308 may be formed from rigid foam and the second insulating layer may be formed from pliable foam. In other examples, the first insulating layer 308 may be formed by foam and the second insulating layer 310 may be formed by metallic reflective material.

Figure 4:
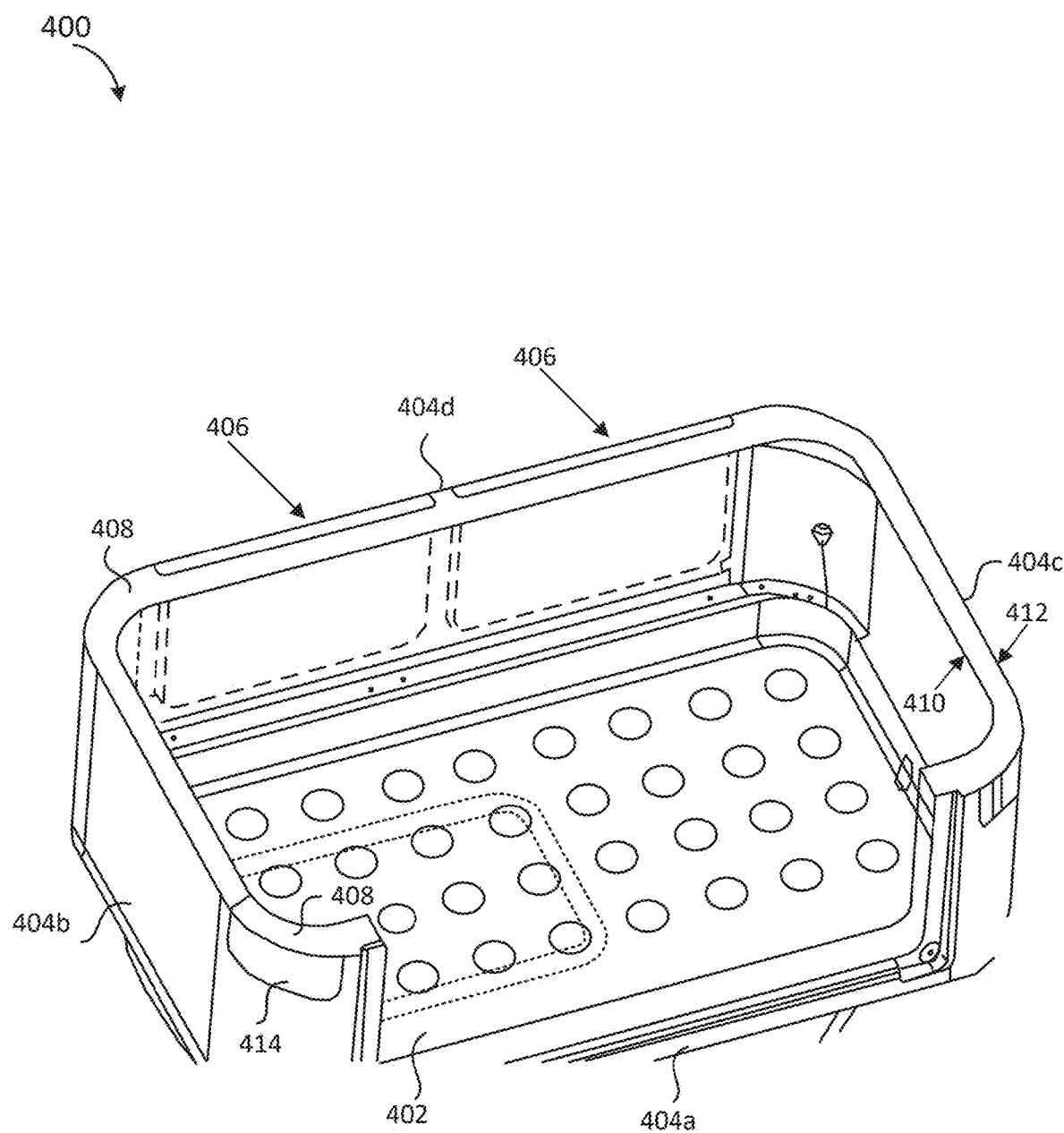
FIG. 4 depicts an example insulated cargo bay, according to at least one example.

FIG. 4 depicts an example insulated cargo bay 400, according to at least one example. The cargo bay 400 is an example of the cargo bay 106 (FIG. 1). The cargo bay 400 is also an example of the insulated liner 200 (FIG. 2). For example, the insulated liner 200 may be incorporated into the insulated cargo bay 400. As illustrated in FIG. 4, the insulated cargo bay 400 includes a bottom 402, and one or more walls (i.e., front wall 404a, side walls 404b and 404c, and rear wall 404d). Each wall 404 may be characterized by an inner surface 410 and an outer surface 412, identified with respect to the wall 404c. The bottom 402 and the walls (i.e., front wall 404a, side walls 404b and 404c, and rear wall 404d) define a cargo volume, which may be insulated using the techniques described herein. In some examples, the cargo bay 400 may include at least one opening, defined opposite the bottom 402 and/or within at least one wall (e.g., the wall 404a) through which users can access the cargo or packages being transported. In some examples, the at least one opening may be covered by a lid (not shown in FIG. 4).

The walls (i.e., front wall 404a, side walls 404b and 404c, and rear wall 404d) may include one or more slots 406 formed within the walls (i.e., front wall 404a, side walls 404b and 404c, and rear wall 404d). In some examples, the walls (i.e., front wall 404a, side walls 404b and 404c, and rear wall 404d) may be orthogonally orientated with respect to the bottom 402. As depicted in FIG. 4, cooling elements may be placed into slots 406. In some examples, the slot 406 may be embedded inside of the walls (i.e., front wall 404a, side walls 404b and 404c, and rear wall 404d). Furthermore, the cargo bay 400 may further include insulation filler 408 that defines the walls 404 and/or is deposited within the walls 404 (e.g., within an interior cavity of the walls 404) and around the slot 406 to prevent the cooling element inserted within the slot 406 from being heated up by the external environment. To achieve improved insulation performance, the insulated liner 200 in FIG. 2 may be incorporated in combination with the cargo bay 400 including insulation filler 408 described herein. In other examples, the slot 406 may also be attached to the inner surface 410 of the walls (i.e., front wall 404a, side walls 404b and 404c, and rear wall 404d). The slot 406 may be formed or molded using the same material of the cargo bay 400. In some examples, the slot 406 may be formed or molded by a different material from the cargo bay material. Additionally, when more than one slot 406 is present, each slot 406 may be formed by using different materials. The shape, geometry, and size of each slot 406 may be adjusted as appropriate. The cargo bay 400 may include any number of slots 406 as appropriate. In some examples, a plurality of slots 406 may be defined or attached to the rear wall 404d or the front wall 404a of the cargo bay 400 in a row to column pattern. Although FIG. 4 depicts a 1×2 layout pattern of slots 406, in some examples, the slots 406 may be arranged to have a 2×4 layout pattern or any other suitable N×M layout pattern, wherein N and M are greater than or equal to 1.

The slot 406 may be positioned at any location at the front wall 404a, the side walls 404b and 404c, and the rear wall 404d. However, the position of the slot 406 should avoid locations or spots that may interfere with the functioning of other components, equipment, or electronics of the robotic delivery vehicle. For example, in some embodiments, electronics (e.g., communication antennas such as long-term evolution (LTE) antennas) may be placed behind the corner window 414 within the walls (i.e., front wall 404a, side walls 404b and 404c, or rear wall 404d) of the cargo bay 400. The corner window 414 may be transparent or opaque as desired. To ensure that the electronics and the communication channel of the robotic delivery vehicle can appropriately perform as expected, certain embodiments may use special material for the filler 408. This special material may have specific attributes within the walls where the electronics are located. In some examples, the special material for the filler 408 may be a material that is different from the typical material used for the insulation filler 408. For example, when LTE antennas are used, as LTE antennas are sensitive to its operating environment, the special material may be non-conductive materials to avoid interference with the functioning of the LTE antennas.

Figure 5:
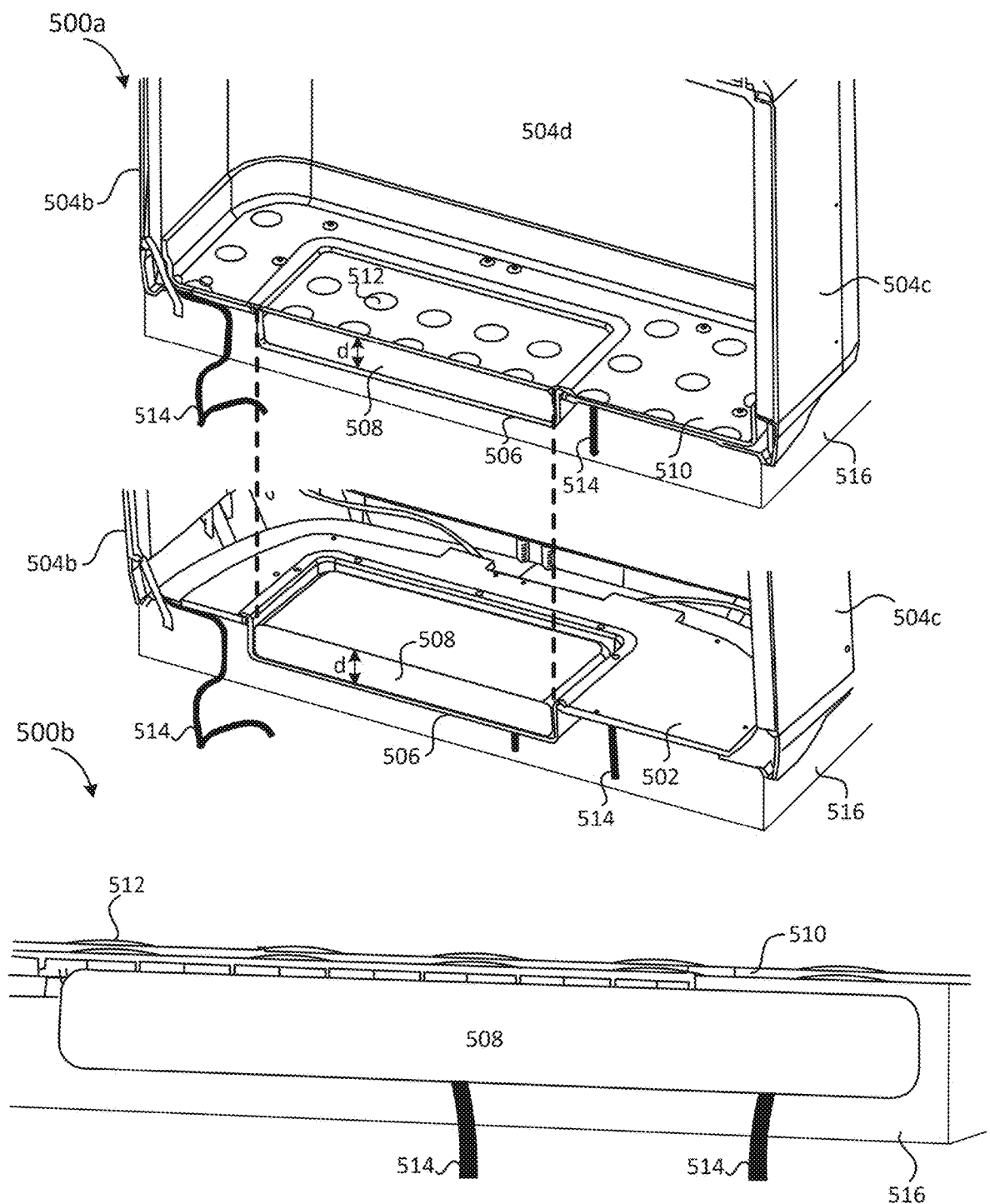
FIG. 5 depicts an example insulated cargo bay, according to at least one example.

FIG. 5 depicts an example insulated cargo bay 500a, according to at least one example. The insulated cargo bay 500a is an example of the cargo bay 106 (FIG. 1) and the cargo bay 400 (FIG. 4). The insulated cargo bay 500a is also an example of the insulated liner 200 (FIG. 2). For example, the walls of the insulated liner 200 may be incorporated into the insulated cargo bay 500a. As illustrated in FIG. 5, the insulated cargo bay 500a includes a bottom 502, one or more walls (i.e., front wall 504a (not shown in FIG. 5), side walls 504b and 504c, and rear wall 504d), a nest 506 to house cooling element(s) 508, and a drip tray 510 having a plurality of openings 512 to guide out and catch moisture drips and minor spills caused from condensation from the cooling element(s) to protect the cargo or packages being transported from getting wet.

As depicted by FIG. 5, the bottom 502 and the walls (i.e., front wall 504a, side walls 504b and 504c, and rear wall 504d) define a cargo volume, which may be insulated using the techniques described herein. Moreover, in some examples, the cargo bay 500a may include at least one opening through which users can access the cargo or packages being transported. The opening may be located at the top of the cargo bay or in one of the walls. In some examples, the at least one opening may be covered by a lid (not shown in FIG. 5).

The nest 506 refers to a recess region that has a displacement (d) from the bottom 502. In some examples, the nest 506 may define a volume to house an oversized cooling element 508, such as a large ice pack, that cannot fit in the cooling-element volume 304 in FIG. 3. Moreover, an oversized cooling element 508 can also be incorporated to the insulated liner 300 depicted in FIG. 3 to improve the overall cooling performance of the cargo bay. In some examples, the nest 506 may be embedded in a nest insulation 516. For example, the nest insulation 516 may extend below the nest 506, along sides of the nest 506, and below the bottom 502 of the carbo bay 500*a*. The nest insulation 516 may be formed from any combination of materials, forms, and structures as described herein.

The drip tray 510 may be formed by any materials that sufficiently isolate the cargo or packages being transported from condensation moisture. The opening 512 may have any size or shape as desired. The drip tray 510 may be fixed to or removable from the bottom 502. Additionally, as depicted in configuration 500*b*, the drip tray 510 may have a two-tier structure that includes multiple layers of openings 512 that are stacked vertically. Besides protecting the cargo or packages that are placed within the cargo bay from unwanted moisture, the two-tier drip tray can provide extra protection to prevent wires 514 or any parts/electronics that are located beneath the bottom 502 from unwanted spills or moisture.

Figure 6:
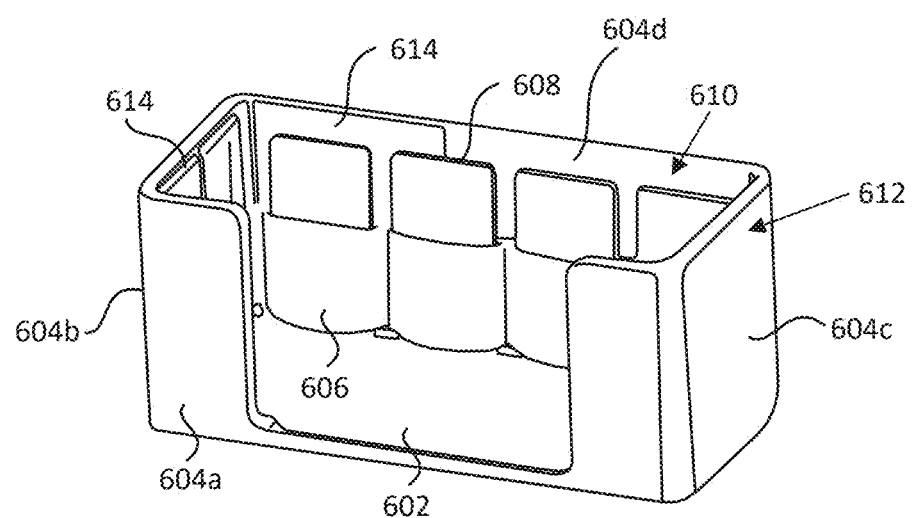
FIG. 6 depicts an example insulated cargo bay that includes functional pouches, according to at least one example.

FIG. 6 depicts an example insulated cargo bay 600 that includes functional pouches, according to at least one example. The insulated cargo bay 600 is an example of the insulated cargo bays 106 (FIG. 1), 400 (FIG. 4), and 500*a* (FIG. 5). The cargo bay 600 is also an example of the insulated liner 200 (FIG. 2). For example, the insulated liner 200 may be incorporated into the insulated cargo bay 600. As illustrated in FIG. 6, the insulated cargo bay 600 includes a bottom 602, one or more walls (i.e., front wall 604*a*, side walls 604*b* and 604*c*, and rear wall 604*d*), and a set of functional pouches 606 (e.g., referred to herein as a functional pouch 606 or the functional pouches 606), each of which is capable of supporting, retaining, or holding insertion element 608. In some examples, the number of functional pouches 606 is one or more. The functional pouch 606 may have any shape, geometry, and size as needed. In some examples, the functional pouch 606 has a pocket shape. The one or more walls 604 include an inner surface 610 and an outer surface 612. The insertion element 608 may be a cooling element like ice packs or any other element that improves the overall insulation and/or cooling performance of the cargo bay 600. In some examples, the insertion element 608 may be desiccant packs that sustain the dryness within the cargo bay 600. Additionally, the functional pouch 606 may be attached at any location of the inner surface 610 of the one or more walls. The functional pouch 606 may be permanently fixed to or removable from the inner surface 610.

In some examples, the cargo bay 600 further includes a layer of insulation wallpaper 614 upon which the functional pouch 606 may be attached. The insulation wallpaper 614 may be molded foam such as EVA, EPX, polyurethane, or the like. Moreover, the insulation wallpaper 614 may include more than one material as desired. For example, the insulation wallpaper 614 may have a laminated stack structure wherein a plurality of layers made of different materials are attached together to form a united sheet. The functional pouch 606 may be attached to the insulation wallpaper 614 via various methods. For instance, the functional pouch 606 may be stitched, glued, or mechanically coupled to the insulation wallpaper 614.

Figure 7:
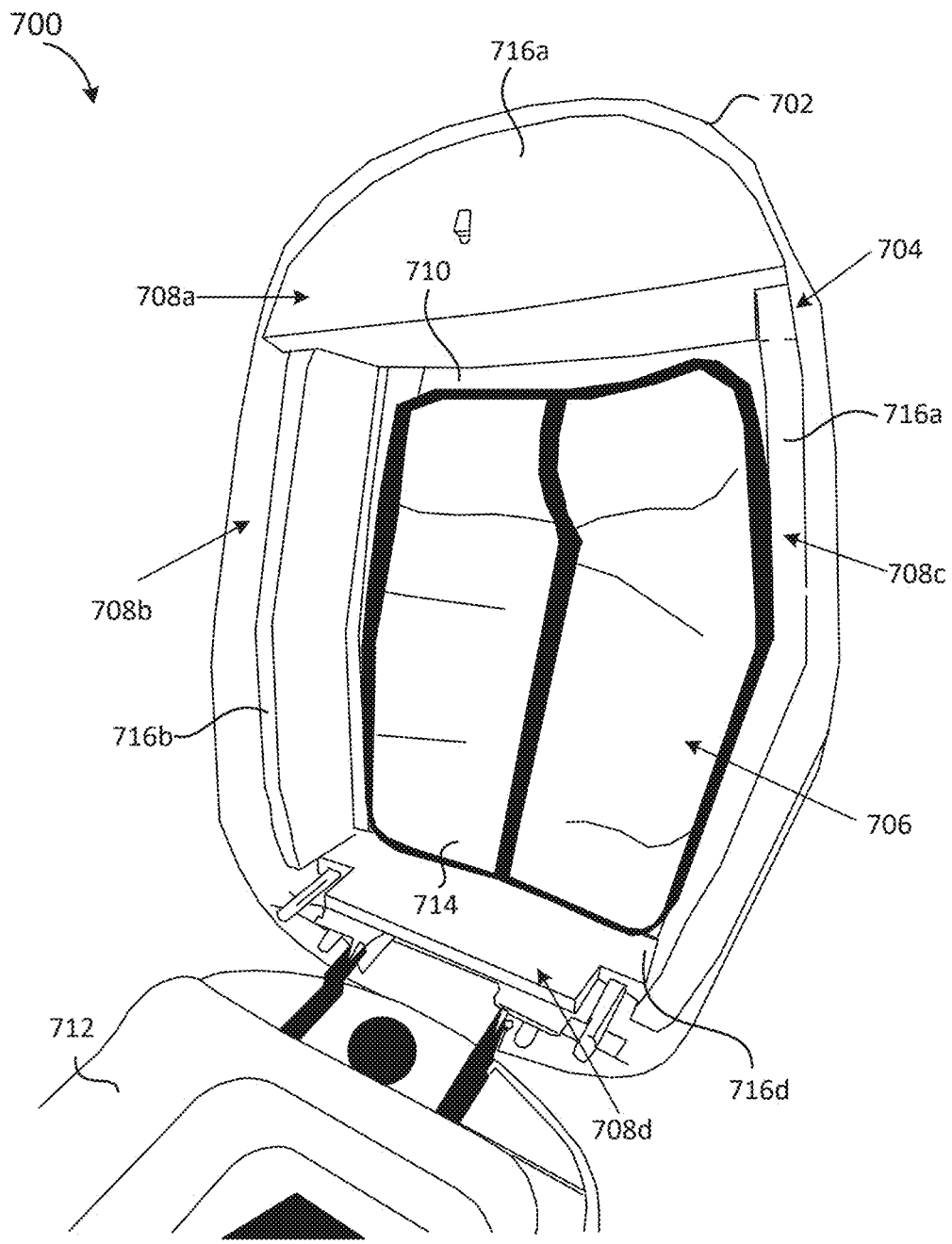
FIG. 7 depicts an example robotic delivery vehicle including a vehicle lid, according to at least one example.

FIG. 7 depicts an example robotic delivery vehicle 700 including a vehicle lid 702, according to at least one example. The robotic delivery vehicle 700 is an example of the robotic delivery vehicle 100 (FIG. 1) and the lid 702 is an example of the lid 102 (FIG. 1). The vehicle lid 702 includes an outer shell 704 that defines the shape of the vehicle lid 702, a main part 706, at least one side part 708 (i.e., head side part 708*a*, left side part 708*b*, right side part 708*c*, and tail side part 708*d*), and a lid roof 710. In some examples, the main part 706 refers to the volume along an underside of the lid roof 710, and a storage volume can be formed between a cargo bay 712 and the main part 706. The at least one side part 708 (i.e., head side part 708*a*, left side part 708*b*, right side part 708*c*, and tail side part 708*d*) may surround the main part 706. The lid roof 710 may refer to the interior surface of the outer shell 704 that defines a lid volume.

In some examples, the vehicle lid 702 may include insulation within the interior volume. The vehicle lid 702 may include a first insulation addition 714 disposed in the main part 706 and a second insulation addition 716 in the at least one side part 708 to improve the overall insulation performance of the cargo bay. The first insulation addition 714 and the second insulation addition 716 may be attached or fixed to the interior of the vehicle lid 702 via any mechanism. In some examples, using the friction at the contact surface between the first insulation addition 714 and/or the second insulation addition 716 and the interior of the vehicle lid 702, the first insulation addition 714 and/or the second insulation addition 716 can be supported in part by the vehicle lid 702.

The second insulation addition 716 may be disposed at any location within the at least one side part 708 as desired. In some examples, the second insulation addition 716 may include subset insulation additions 716*a*, 716*b*, 716*c*, and 716*d* that are disposed in the head side part 708*a*, the left side part 708*b*, the right side part 708*c*, and the tail side part 708*d*, respectively.

The first insulation addition 714 and the second insulation addition 716 may be any material that a person skilled in the art find appropriate to meet the insulation needs. Exemplary insulative materials include, but are not limited to, foam, wool, metallic insulation materials (e.g., heat reflective bubble wrap), natural fibers, polystyrene, or the like. The first insulation addition 714 and the second insulation addition 716 may use identical or different materials. Moreover, the first insulation addition 714 and the second insulation addition 716 may be any combination of materials as needed. In some examples, a combined insulation addition configuration may include ice packs in the left side parts 708*b* and the right side part 708*c* as well as stacked insulative foam boards in the head side part 720*a* and the tail side part 708*d*. In some examples, the first insulation addition 714 and the second insulation addition 716 may be a composite of different materials that can further contribute non-insulation attributes or advantages. For example, to acquire waterproof attribute, a composite insulation addition may be configured to wrap a portion of insulative foam sheet in a thin pliable durable fabric (e.g., PVC or polyethylene) that is waterproof or water resistant. In some examples, the first insulation addition 714 and/or the second insulation addition 716 may be a multi-layer insulator that includes a plurality of insulating foam parts.

The first insulation addition 714 and the second insulation addition 716 are not limited to any configuration, form, or structure. For example, the first insulation addition 716 may simply be an insulating sheet mounted to the lid roof 710. On the other hand, the first insulation addition 716 may be configured to include attachment mechanisms for mounting cooling elements or components. The attachment mechanisms may include a hook fabric capable of connecting with corresponding loops fabric pieces that are attached to an insulating blanket. The insulating blanket may include openings, pockets, or the like to receive cooling elements such as ice packs and the like. In some examples, the attachment mechanism may be a fabric that wraps a foam sheet such that a hook and loop fastener may be attached to any location on the fabric. The insulating foam sheet may be attached to the vehicle lid 702 using a pressure sensitive adhesive or any other suitable attachment substance or method.

Figure 8:
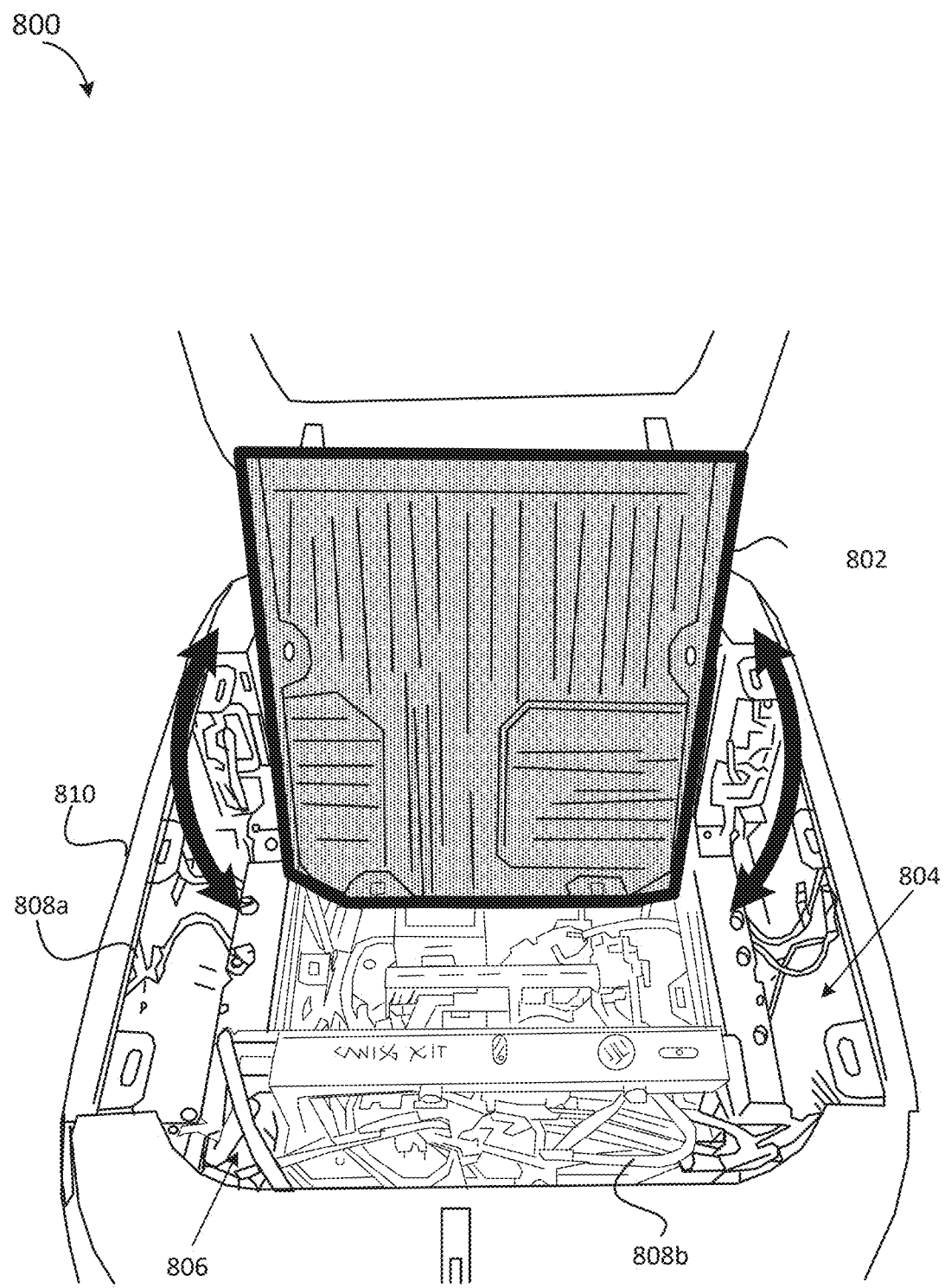
FIG. 8 depicts an example robotic delivery vehicle including an access panel, according to at least one example.

FIG. 8 depicts an example robotic delivery vehicle 800 including an access panel 802, according to at least one example. The robotic delivery vehicle 800 is an example of the robotic delivery vehicles 100 (FIG. 1) and 700 (FIG. 7). As illustrated by FIG. 8, the access panel 802 may separate a cargo bay 804 and an equipment compartment 806. The equipment compartment 806 includes robotic equipment and electronics 808 (i.e., 808a and 808b). Exemplary equipment and electronics 808 may include one or more batteries, electric motors, communication antennae, Global Positioning System (GPS) chips, control boards, and the like. The robotic equipment and electronics 808 may be located in the walls between an outside surface 810 of equipment compartment 806 and the cargo bay 804. To avoid interference with the robotic equipment and electronics 808, when metallic insulation materials like metallic bubble wrap are used, the locations where metallic insulation materials may be disposed can be adjusted according to the layout and/or the location of the robotic equipment and electronics 808.

The access panel 802 may be lifted to an open position as depicted in FIG. 8 when access to the equipment compartment 806 is needed. Although FIG. 8 depicts a configuration in which the access panel 802 is lifted to expose the equipment compartment 806, a person skilled in the art should perceive that any appropriate mechanism may be used to create the open/closed status of the access panel 802. In some examples, a sliding/folding mechanism may be used, wherein the access panel 802 can be slid or folded toward the direction pointing inside the paper to close the access panel 802 so that the equipment compartment 806 is exposed.

The access panel 802 may be made of any material as desired. In some examples, the access panel 802 may be insulated. In particular, a first side of the access panel 802 that faces the equipment compartment 806 may include one or more layers of insulating material such as heat reflecting bubble wrap and the like. In some examples, more than one layer of insulating material may be applied, which may be contoured to account for equipment in the equipment compartment 806. Such material may be beneficial for reflecting the heat generated in the equipment compartment 806 away from the access panel, which forms the bottom of the cargo bay that supports the cargo. The opposite side of the access panel 802 may also be insulated with one or more layers of insulation materials such as heat reflective bubble wrap, metallic insulation materials, or other comparable material.

Figure 9:
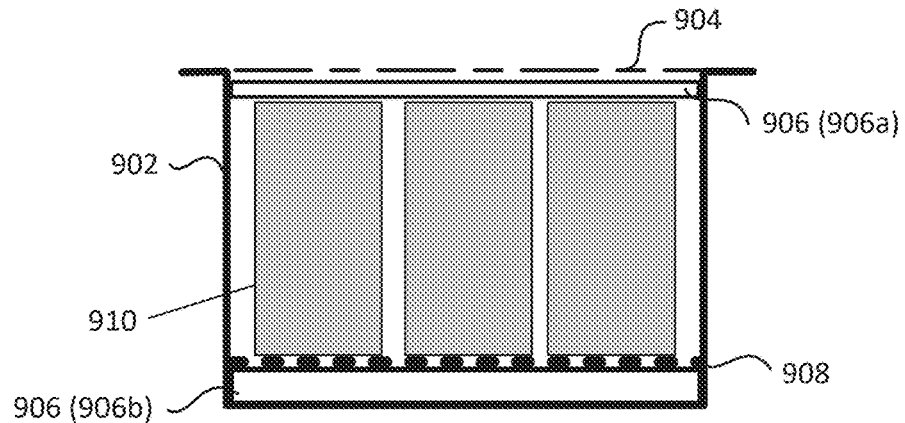
FIG. 9 depicts an example cargo bay insulation configuration, according to at least one example.

FIG. 9 depicts an example cargo bay insulation configuration 900, according to at least one example. The insulated liner 902 is an example of the insulated liners 200 (FIG. 2) and 300 (FIG. 3). The insulation configuration 900 includes a rigid insulation cover 904, at least one cooling element 906, and a bottom layer 908. The at least one cooling element 906 may be disposed in various locations within the insulated liner 902. In some examples, the at least one cooling element 906 (i.e., 906a and 906b) may be simultaneously disposed above packages 910 and beneath the bottom layer 908. In some examples, the rigid insulation cover 904 may be the vehicle lid 702 in FIG. 7. In other examples, the rigid insulation cover 904 may be an extra insulation layer such as a cardboard or plastic sheet that is disposed between the at least one cooling element 906 and the vehicle lid 702 in FIG. 7.

In some examples, the at least one cooling element 906 may be housed or wrapped in a protective layer that prevents the packages 910 from spills caused by accidental damages of the at least one cooling elements 906. In some examples, the bottom layer 908 disposed between the packages 910 and the insulated liner 902 can physically isolate the packages 910 and the at least one cooling element 906. In some examples, the bottom layer 908 may be water resistant or waterproof.

Figure 10:
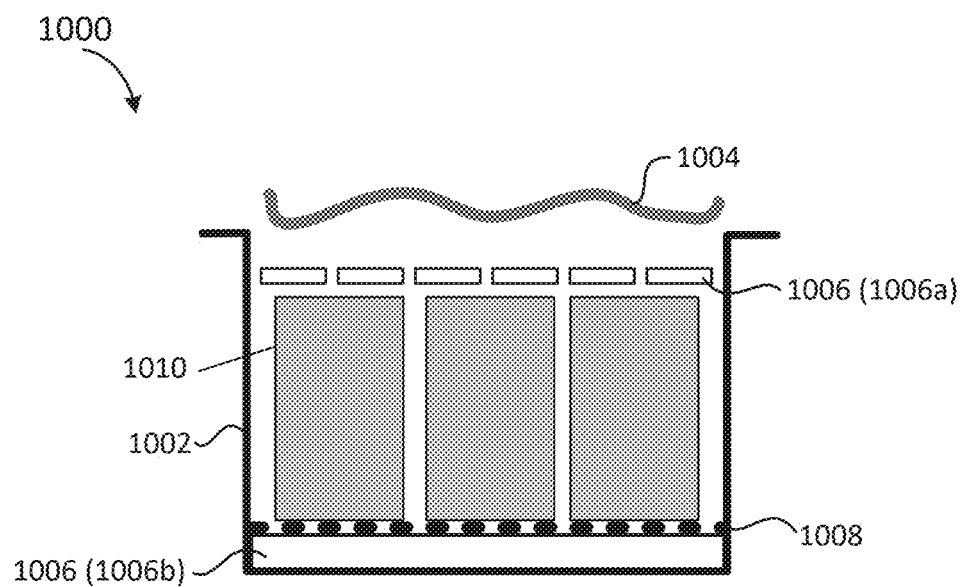
FIG. 10 depicts an example cargo bay insulation configuration, according to at least one example.

FIG. 10 depicts an example cargo bay insulation configuration 1000, according to at least one example. The insulated liner 1002 is an example of the insulated liner 200 (FIG. 2), 300 (FIG. 3), and 902 (FIG. 9). The insulation configuration 1000 includes an adaptive insulation cover 1004, at least one cooling element 1006, and a bottom layer 1008. The adaptive insulation cover 1004 may be disposed on top of the at least one cooling element 1006 and conformally adapts to occupy the volume within the vehicle lid 702 in FIG. 7 and within the volume of the cargo bay. In some examples, the adaptive insulation cover 1004 may be a cooling blanket.

The at least one cooling element 1006 may be disposed in various locations within the insulated liner 1002. In some examples, the at least one cooling element 1006 (i.e., 1006a and 1006b) may be simultaneously disposed above packages 1010 and beneath the bottom layer 1008. In some examples, the at least one cooling element 1006 (i.e., 1006a in FIG. 10) may be a plurality of gel ice packs. In some examples, the bottom layer 1008 may be disposed between the packages 1010 and the insulated liner 1002 and the bottom layer 1008 may physically isolate the packages 1010 and the at least one cooling element 1006. In some examples, the bottom layer 1008 may be water resistant or waterproof.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A robotic delivery vehicle, comprising:
   an enclosure defined by a robotic delivery vehicle body, the enclosure comprising a cargo bay that defines a cargo volume and robotic equipment positioned in the enclosure, the cargo bay comprising:
     an insulated cargo bay liner removably insertable into the cargo bay to occupy a first portion of the cargo volume, the insulated cargo bay liner comprising:
       a first insulated surface that defines a bottom of the cargo bay and represents a boundary between the cargo bay and the robotic equipment positioned in the enclosure; and
       a second insulated surface that defines a wall of the cargo bay and extends from the first insulated surface; and
     an insulated lid connected to the enclosure and that defines a lid volume, the insulated lid comprising:
       a lid insulator supported at least in part by the insulated lid and configured to occupy a portion of the lid volume at least when the insulated lid encloses the cargo volume.

2. The robotic delivery vehicle of claim 1, wherein the insulated cargo bay liner is wrapped along an exterior surface with a first insulating material comprising a foam.

3. The robotic delivery vehicle of claim 1, wherein the second insulated surface that defines the wall of the cargo bay is about orthogonally orientated with respect to the bottom.

4. The robotic delivery vehicle of claim 1, wherein the bottom of the cargo bay comprises an access panel for accessing the robotic equipment, and wherein the access panel comprises at least one layer of insulating material on a first side and at least two layers of insulating material on a second opposite side, and wherein the at least one layer of insulating material and the at least two layers of insulating material comprise metallic insulation.

5. The robotic delivery vehicle of claim 4, further comprising communication antennas that are embedded within a side wall of the enclosure, wherein the communication antennas are disposed behind a corner window of the side wall.

6. A system, comprising:
   a liner configured for insulating a cargo bay within an enclosure defined by a body of a robotic delivery vehicle, the liner representing a boundary between the cargo bay and robotic equipment positioned in the enclosure, the liner comprising:
     an insulated bottom; and
     at least one insulated wall extending from the insulated bottom, wherein the at least one insulated wall and the insulated bottom define a cargo volume; and
   a lid that defines a lid volume and is configured to selectively enclose the cargo volume.

7. The system of claim 6, wherein the lid comprises a lid insulator.

8. The system of claim 7, wherein the lid defines a lid volume that is defined by an interior surface of the lid, and wherein the lid insulator is disposed along the interior surface.

9. The system of claim 7, wherein the lid insulator is an insulating blanket that conformally occupies a portion of the lid volume and a portion of the cargo volume.

10. The system of claim 9, wherein the insulating blanket comprises a plurality of pockets each configured to retain a cooling pack.

11. The system of claim 8, wherein the interior surface is characterized by a top surface connected to at least one wall, and wherein the lid insulator is disposed along the top surface and the at least one insulated wall.

12. The system of claim 6, wherein the insulated bottom comprises a nest configured to retain a cooling pack.

13. The system of claim 8, further comprising a fabric disposed along a portion of the lid insulator disposed along the interior surface.

14. The system of claim 11, wherein the lid insulator comprises a plurality of insulating foam parts, and wherein at least one first foam part is disposed along the top surface, and wherein at least one second foam part is disposed along the at least one insulated wall.

15. The system of claim 11, wherein the lid insulator comprises a plurality of insulating foam parts, wherein at least one insulating first foam part of the plurality of insulating foam parts is disposed along the top surface, and wherein two or more insulating foam parts of the plurality of insulating foam parts are disposed along a plurality of insulated walls.

16. The system of claim 13, wherein the fabric is configured to selectively couple with an insulating blanket, and wherein the insulating blanket comprises a plurality of pockets each configured to retain a cooling pack.

17. The system of claim 6, wherein the at least one insulated wall comprises one or more slots each sized and configured to receive cooling pack.

* * * * *